(12) United States Patent
Ferris

(10) Patent No.: US 8,922,940 B1
(45) Date of Patent: Dec. 30, 2014

(54) DATA STORAGE DEVICE REDUCING SPINDLE MOTOR VOLTAGE BOOST DURING POWER FAILURE

(71) Applicant: Western Digital Technologies, Inc., Irvine, CA (US)

(72) Inventor: Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/287,550

(22) Filed: May 27, 2014

(51) Int. Cl.
G11B 21/02 (2006.01)
G11B 5/596 (2006.01)
G11B 19/04 (2006.01)
G11B 19/28 (2006.01)

(52) U.S. Cl.
CPC ............ *G11B 19/047* (2013.01); *G11B 19/28* (2013.01)
USPC .......................................... 360/75; 360/78.04

(58) Field of Classification Search
None
See application file for complete search history.

(56) References Cited

U.S. PATENT DOCUMENTS

| | | | |
|---|---|---|---|
| 5,414,861 A | 5/1995 | Horning | |
| 5,438,549 A | 8/1995 | Levy | |
| 5,889,629 A | 3/1999 | Patton, III | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |

(Continued)

OTHER PUBLICATIONS

Timothy A. Ferris, et al., U.S. Appl. No. 13/316,128, filed Dec. 10, 2012, 15 pages.

*Primary Examiner* — Andrew L Sniezek

(57) ABSTRACT

A data storage device is disclosed comprising a head actuated over a disk, a spindle motor configured to rotate the disk, and control circuitry configured to perform a power fail operation by boosting a power voltage generated based on the spindle motor to generate a boosted voltage, controlling an operation of the data storage device using the boosted voltage, and when the power voltage falls below a threshold, reducing the boosting so as to reduce the boosted voltage.

16 Claims, 4 Drawing Sheets

(56) References Cited

U.S. PATENT DOCUMENTS

| | | |
|---|---|---|
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,594,102 B1 | 7/2003 | Kanda et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,856,556 B1 | 2/2005 | Hajeck |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |

(56) References Cited

U.S. PATENT DOCUMENTS

| | | |
|---|---|---|
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,623,316 B1 | 11/2009 | Rana et al. |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,733,712 B1 | 6/2010 | Walston et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,974,038 B2 | 7/2011 | Krishnan et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2003/0227707 A1* | 12/2003 | Kokami et al. ............... 360/75 |
| 2006/0072237 A1* | 4/2006 | Kokami ........................ 360/75 |
| 2008/0111423 A1 | 5/2008 | Baker et al. |
| 2009/0140575 A1 | 6/2009 | McGee et al. |
| 2009/0206657 A1 | 8/2009 | Vuk et al. |
| 2009/0289607 A1 | 11/2009 | Mentelos |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DATA STORAGE DEVICE REDUCING SPINDLE MOTOR VOLTAGE BOOST DURING POWER FAILURE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track. A spindle motor rotates the disk at a high speed so that an air bearing forms between the head and the disk such that the head flies just above the disk surface.

When a power failure occurs, it is desirable to park the head before the air bearing dissipates, such as by unloading the head onto the ramp near the outer diameter of the disk. It may also be desirable to finish a current write operation and/or to flush a write cache to the disk prior to parking the head. When the supply voltage is lost due to a power failure, the momentum of the disk spinning generates a back electromotive force (BEMF) voltage across the windings of the spindle motor. Disk drives will typically boost this BEMF voltage using a suitable voltage booster, and utilize the boosted voltage to power the control circuitry used, for example, to finish a current write operation by flushing cached write data to a non-volatile semiconductor memory. The BEMF voltage is also typically used as a current source for the switches of a H-bridge driver that drives the VCM for parking the head (e.g., by unloading the head onto a ramp).

DETAILED DESCRIPTION

Figure 1A:
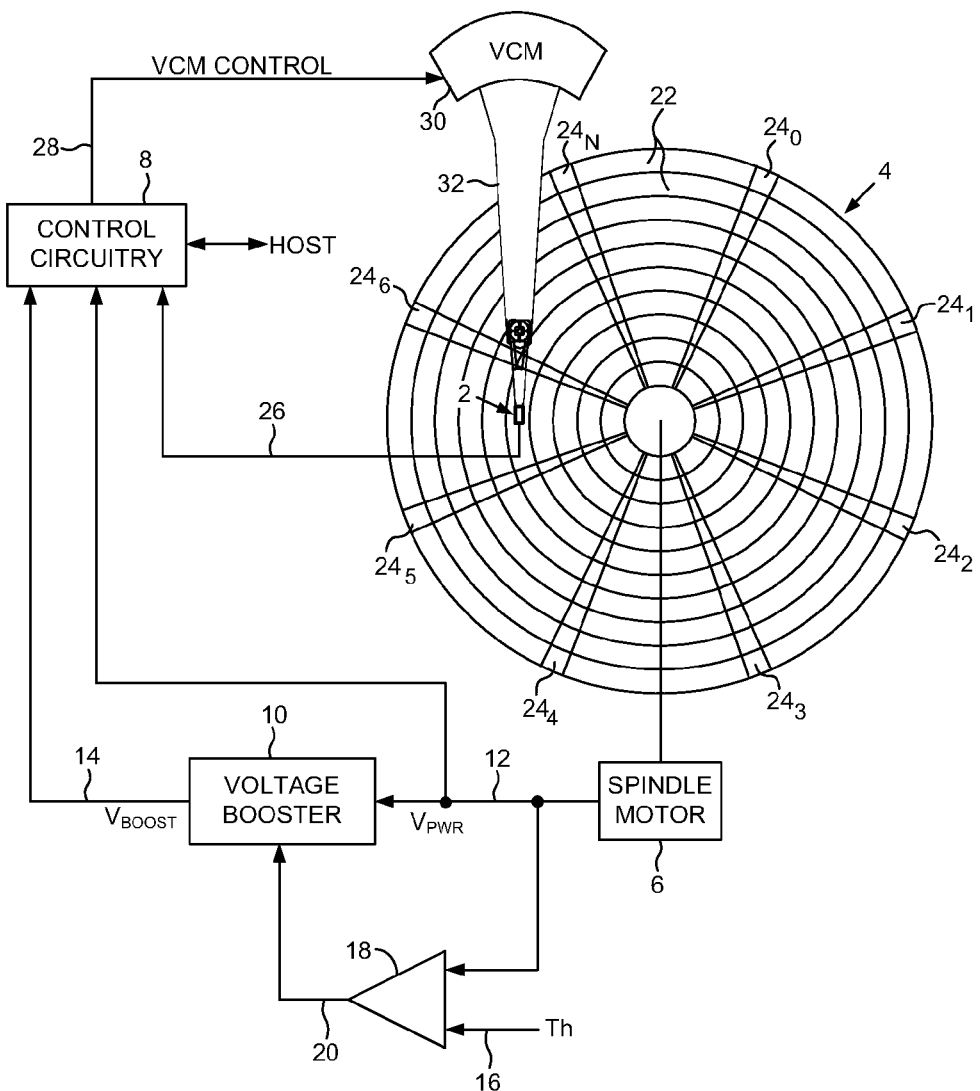
FIG. 1A shows a data storage device in the form of a disk drive comprising a head actuated over a disk, and a spindle motor configured to rotate the disk.

FIG. 1A shows a data storage device in the form of a disk drive according to an embodiment comprising a head 2 actuated over a disk 4, a spindle motor 6 configured to rotate the disk 4, and control circuitry 8 configured to perform a power fail operation by boosting 10 a power voltage 12 generated based on the spindle motor 6 to generate a boosted voltage 14, controlling an operation of the data storage device using the boosted voltage 14, and when the power voltage 12 falls below a threshold 16 at comparator 18, reducing the boosting 10 via control signal 20 so as to reduce the boosted voltage 14.

In the embodiment of FIG. 1A, the disk 4 comprises a plurality of servo tracks 22 defined by servo sectors $24_0$-$24_N$, wherein data tracks are defined relative to the servo tracks at the same or different radial density. The control circuitry 8 processes a read signal 26 emanating from the head 2 to demodulate the servo sectors $24_0$-$24_N$ and generate a position error signal (PES) representing an error between the actual position of the head and a target position relative to a target track. The control circuitry 8 filters the PES using a suitable compensation filter to generate a control signal 28 applied to a voice coil motor (VCM) 30 which rotates an actuator arm 32 about a pivot in order to actuate the head 2 radially over the disk 4 in a direction that reduces the PES. The servo sectors $24_0$-$24_N$ may comprise any suitable head position information, such as a track address for coarse positioning and servo bursts for fine positioning. The servo bursts may comprise any suitable pattern, such as an amplitude based servo pattern or a phase based servo pattern.

Figure 1B:
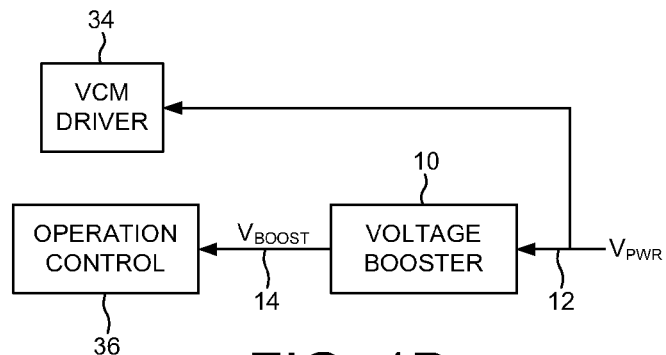
FIG. 1B shows an embodiment wherein a power voltage generated based on the spindle motor is boosted to generate a boosted voltage, wherein the boosting is reduced when the power voltage falls below a threshold.

FIG. 1B shows control circuitry according to an embodiment wherein during a power failure, the power voltage 12 generated based on the spindle motor 6 is applied to a VCM driver 34 which in one embodiment comprises field effect transistors (FETs) that form a H-bridge driver. The boosted voltage 14 is used to control an operation of the data storage device at block 36, such as finishing a current write command by flushing cached write data to a non-volatile semiconductor memory. In one embodiment, the power voltage 12 is generated based on a back electromotive force (BEMF) generated by the spindle motor 6 using any suitable technique, such as the technique disclosed in U.S. Pat. No. 6,577,465 entitled "DISK DRIVE COMPRISING SPIN DOWN CIRCUITRY HAVING A PROGRAMMABLE SIGNAL GENERATOR FOR ENHANCING POWER AND BRAKING CONTROL" the disclosure of which is incorporated herein by reference.

In one embodiment, the magnitude of the input current to the voltage booster 10 depends on the magnitude of the power voltage 12, the boost factor K of the voltage booster 10, and the boost efficiency η, such that:

$$I_{IN} = I_{OUT} * K / \eta$$

Figure 2:
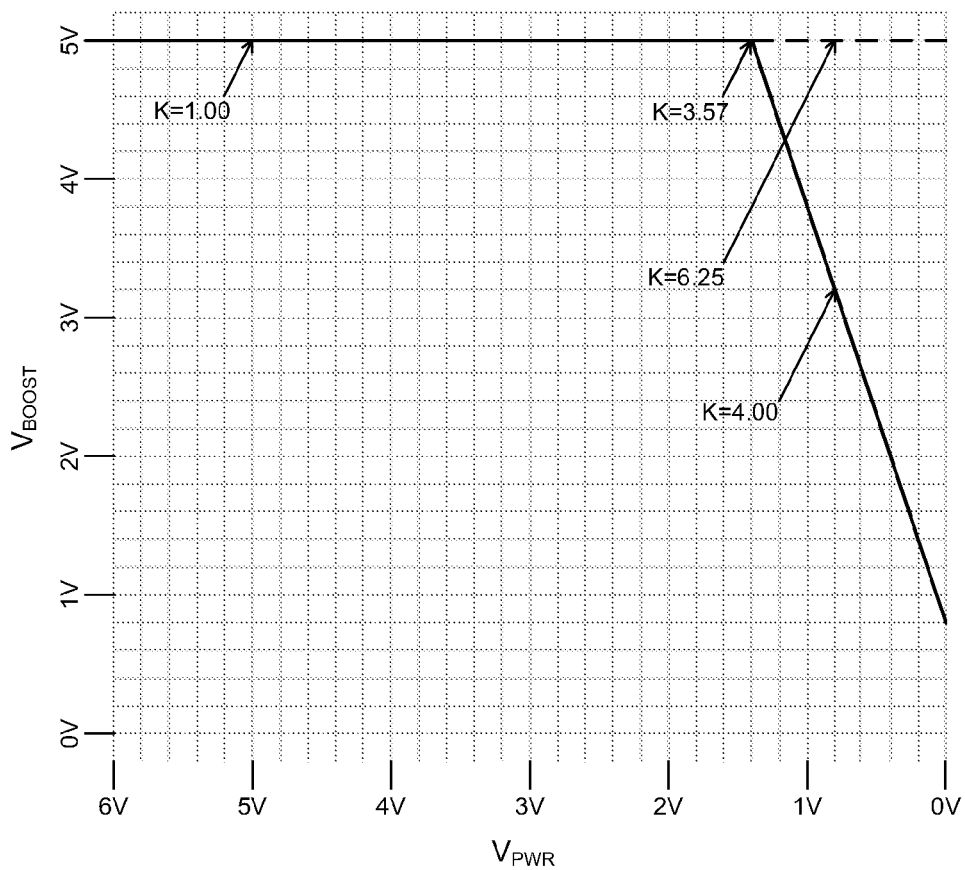
FIG. 2 shows an embodiment wherein the boosted voltage is reduced based on a linear function of the power voltage.

The above equation illustrates that as the power voltage 12 decreases during a power failure (due to the kinetic energy of spindle motor decreasing as it slows), the amount of input current required to maintain the target boosted voltage 14 increases (due to the boost factor K increasing in the above equation). This is illustrated in the example of FIG. 2 wherein if the boosted voltage 12 were maintained at 5v as the power voltage 12 decreases to 0.8v, the boost factor K increases from 3.57 to 6.25 leading to a corresponding increase in current consumption by the voltage booster 10. As more current is consumed by the voltage booster 10, the power voltage 12 provides less current to the VCM driver 34 for parking the head 2 (e.g., unloading the head onto a ramp). This may result in less efficient power consumption by the control circuitry 10 and VCM driver 34, thereby decreasing performance and/or causing malfunction of the disk drive.

Figure 3:
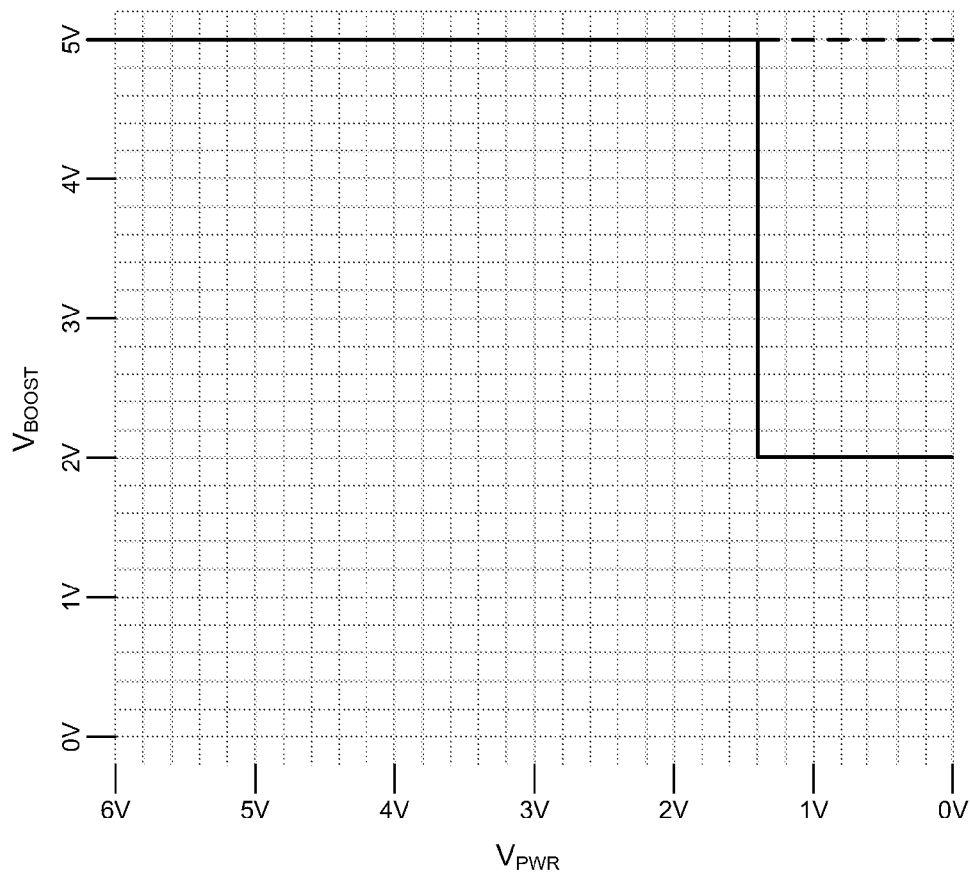
FIG. 3 shows an embodiment wherein the boosted voltage is reduced by a step decrement based on the power voltage.
Figure 4:
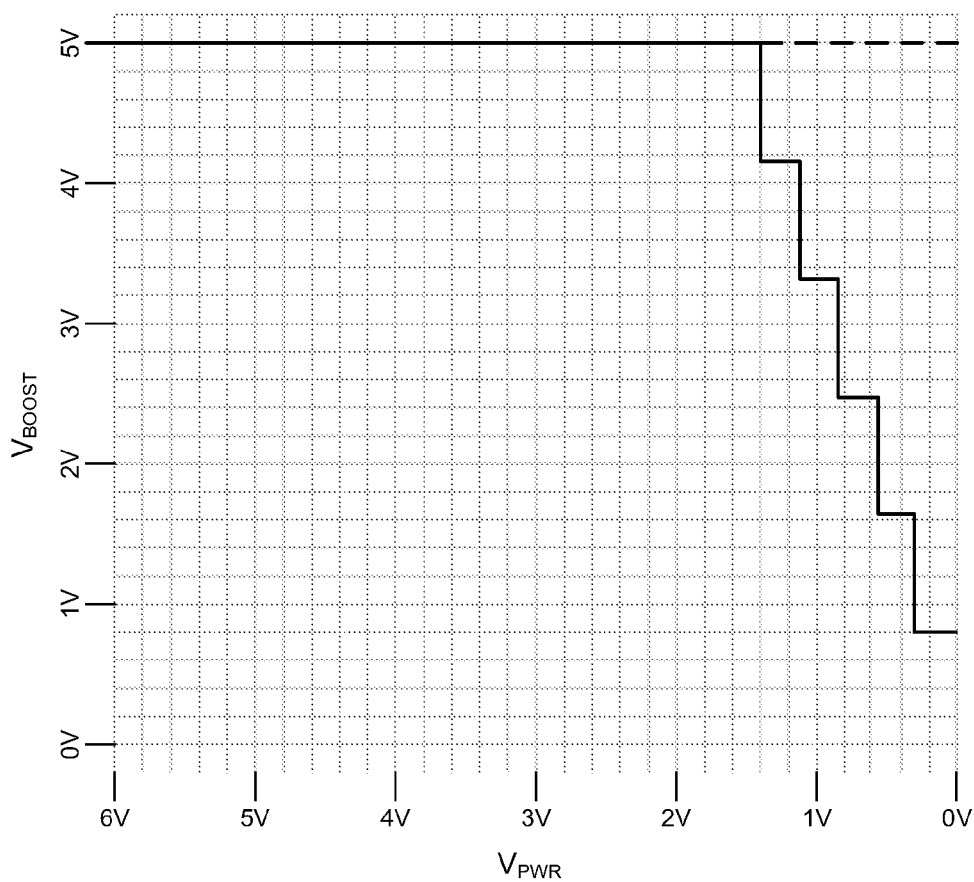
FIG. 4 shows an embodiment wherein the boosted voltage is reduced by a staircase of decrements based on the power voltage.

Accordingly, in one embodiment the power voltage 12 generated based on the spindle motor 6 is monitored during a power failure, and when the power voltage 12 falls below a threshold 16, the boosting of the power voltage 12 is reduced so as to reduce the boosted voltage (and corresponding boost factor K in the above equation). FIG. 2 shows an example of this embodiment wherein at the beginning of a power failure the voltage booster 10 is configured to generate a boosted voltage capped at 5v. When the power voltage 12 decreases to 5v, the boost factor K of the voltage booster 10 is unity. In one embodiment, when the power voltage 12 falls below 1.4v, the boosting by the voltage booster 10 is reduced so that:

$$V_{BOOST} = 3 * V_{PWR} + 0.8$$

where $V_{PWR}$ represents the power voltage 12 and $V_{BOOST}$ represents the boosted voltage 14. In this manner, when the power voltage 12 decreases to 0.8v as in the above example, the boost factor K is reduced from 6.25 to 4.0, thereby providing more current to the VCM driver 34 to park the head 2. The above equation illustrates a particular embodiment whereas in general the boosted voltage 14 may be reduced based on:

$$V_{BOOST}=M*V_{PWR}$$

where M is a non-zero scalar. The above equation reduces the boosted voltage 14 based on a linear function of the power voltage 12, but other embodiments may employ any suitable function, such as any suitable polynomial. Other embodiments may reduce the boosted voltage 14 based on a non-linear function of the power voltage 12, such as by reducing the boosted voltage 14 in a step decrement as illustrated in the embodiment of FIG. 3, or by reducing the boosted voltage 14 by a staircase of decrements based on the power voltage 12 as illustrated in the embodiment of FIG. 4.

In one embodiment, as the boosted voltage 14 is reduced, the operation control 36 shown in FIG. 1B may be throttled in any suitable manner so that the power fail operation is more efficient in terms of power consumption and longevity. For example, in an embodiment where write data may be flushed to a non-volatile semiconductor memory during a power failure, the operating frequency of the control circuitry may be reduced so as to throttle down the flush operation to conserve power while ensuring the flush operation finishes before the power voltage 12 falls below a critical level. An example embodiment of this invention is disclosed in U.S. Pat. No. 8,630,054 entitled "SYSTEMS AND METHODS FOR DATA THROTTLING DURING DISK DRIVE POWER DOWN" the disclosure of which is incorporated herein by reference.

The voltage booster 10 shown in FIG. 1A may be implemented in any suitable manner, such as by using an inductive booster having a variable boost factor K. The power voltage 12 may also be monitored in any suitable manner during a power failure, such as by comparing the analog power voltage 12 to a threshold using an analog comparator, or by sampling the power voltage 12 and comparing the power voltage samples to a threshold using a digital comparator. Similarly, the boost factor K of the voltage booster 10 may be configured through analog control circuits and/or digital control circuits. For example, the voltage booster 10 may be programmably configured by a microprocessor executing the instructions of a control program.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a head actuated over a disk;
a spindle motor configured to rotate the disk; and
control circuitry configured to perform a power fail operation by:
boosting a power voltage generated based on the spindle motor to generate a boosted voltage;
controlling an operation of the data storage device using the boosted voltage; and
when the power voltage falls below a threshold, reducing the boosting so as to reduce the boosted voltage.

2. The data storage device as recited in claim 1, wherein the power voltage is generated based on a back electromotive force (BEMF) voltage generated by the spindle motor.

3. The data storage device as recited in claim 2, further comprising a voice coil motor (VCM) configured to actuate the head over the disk, wherein the control circuitry is further configured to perform the power fail operation by controlling the VCM based on the power voltage.

4. The data storage device as recited in claim 3, wherein reducing the boosting increases an available current to drive the VCM using the BEMF voltage.

5. The data storage device as recited in claim 1, wherein the boosted voltage is reduced based on a linear function of the power voltage.

6. The data storage device as recited in claim 5, wherein the boosted voltage is reduced based on:

$$V_{BOOST}=M*V_{PWR}$$

where:
$V_{PWR}$ is the power voltage;
$V_{BOOST}$ is the boosted voltage; and
M is a non-zero scalar.

7. The data storage device as recited in claim 1, wherein the boosted voltage is reduced by at least one step decrement based on the power voltage.

8. The data storage device as recited in claim 7, wherein the boosted voltage is reduced by a staircase of decrements based on the power voltage.

9. A method of operating a data storage device, the method comprising performing a power fail operation by:
boosting a power voltage generated based on a spindle motor to generate a boosted voltage;
controlling an operation of the data storage device using the boosted voltage; and when the power voltage falls below a threshold, reducing the boosting so as to reduce the boosted voltage.

10. The method as recited in claim 9, wherein the power voltage is generated based on a back electromotive force (BEMF) voltage generated by the spindle motor.

11. The method as recited in claim 10, further comprising performing the power fail operation by controlling a VCM based on the power voltage.

12. The method as recited in claim 11, wherein reducing the boosting increases an available current to drive the VCM using the BEMF voltage.

13. The method as recited in claim 9, wherein the boosted voltage is reduced based on a linear function of the power voltage.

14. The method as recited in claim 13, wherein the boosted voltage is reduced based on:

$$V_{BOOST} = M * V_{PWR}$$

where:
$V_{PWR}$ is the power voltage;
$V_{BOOST}$ is the boosted voltage; and
M is a non-zero scalar.

15. The method as recited in claim 9, further comprising reducing the boosted voltage by at least one step decrement based on the power voltage.

16. The method as recited in claim 15, further comprising reducing the boosted voltage by a staircase of decrements based on the power voltage.

* * * * *